United States Patent [19]
Buyssens et al.

[11] 3,957,091
[45] May 18, 1976

[54] REINFORCING FABRICS

[75] Inventors: Noel Buyssens, Bossuit; Jan Davidts, Rollegem; Arseen Nottebaere, Aalbeke, all of Belgium

[73] Assignee: N.V. Bekaert S.A., Zwevegem, Belgium

[22] Filed: Aug. 5, 1974

[21] Appl. No.: 495,052

[30] Foreign Application Priority Data
Aug. 29, 1973 Belgium .............................. 804133

[52] U.S. Cl. ............................ 139/425 R; 428/256; 428/258
[51] Int. Cl.² ........................................ D03D 15/02
[58] Field of Search ........ 139/425 R, 425 A, 383 R; 161/89, 90, 91; 245/2, 8; 428/225 M, 255, 256, 257–259

[56] References Cited
UNITED STATES PATENTS

| | | | |
|---|---|---|---|
| 1,192,362 | 7/1916 | Young | 161/90 X |
| 2,202,013 | 5/1940 | Lougheed | 161/91 |
| 2,249,940 | 7/1941 | Bulloch | 139/425 R |
| 2,384,771 | 9/1945 | Ryan | 161/91 |
| 3,087,699 | 4/1963 | Foster | 139/425 R |
| 3,828,827 | 8/1974 | Witt et al. | 139/425 R |

FOREIGN PATENTS OR APPLICATIONS 530,871  8/1954  Belgium .............................. 245/2

Primary Examiner—James Kee Chi
Attorney, Agent, or Firm—Edward J. Brenner

[57] ABSTRACT

A woven fabric for reinforcing a resilient material such as rubber or a suitable synthetic material wherein the warp of the fabric consists of individual steel filaments held together in warps by the weft of the fabric.

4 Claims, 1 Drawing Figure

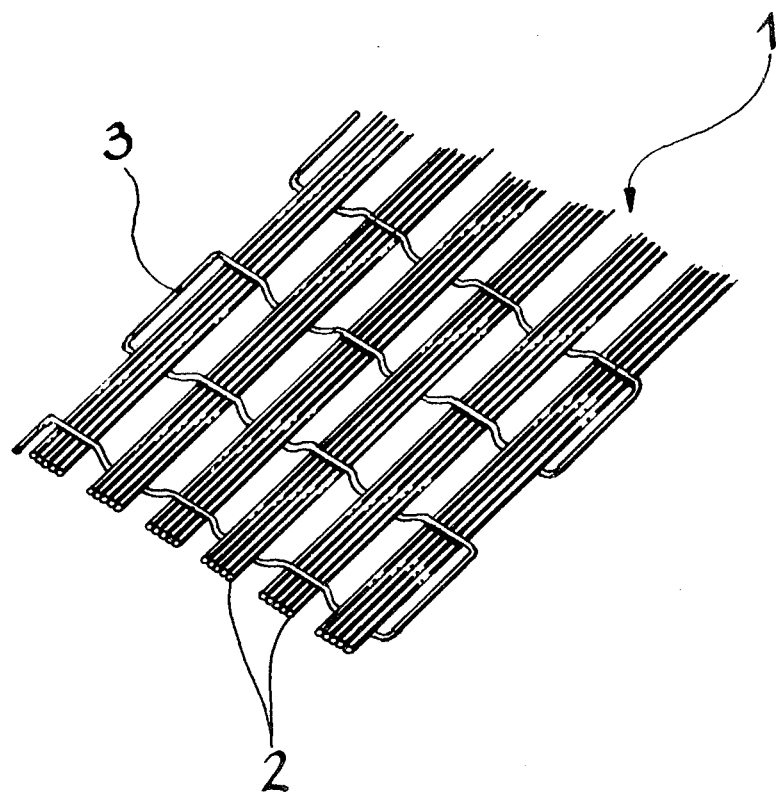
FIG: 1

REINFORCING FABRICS

This invention relates to woven fabric for reinforcing a resilient material such as rubber or a suitable synthetic material.

Such a fabric is described, for example, in French patent No. 1,505,901. The warp of this known fabric is composed of strands or cords. The wires of each strand or cord are kept together as a result of a stranding or cabling process. The weft of this known fabric has only one function. That is to keep the strands or cords of the warp in their correct positions in the fabric.

It is an object of the present invention to provide an improved fabric for reinforcing a resilient material.

According to the invention, there is provided a woven fabric for reinforcing a resilient material, wherein the warp of the fabric consists of individual steel filaments held together in groups by the weft of the fabric.

The accompanying drawing illustrates by way of example one embodiment of a fabric according to the invention. In this embodiment a strip of woven reinforcement fabric 1 consists of a a warp comprising groups of filaments 2, held in place by a weft comprising a single filament 3 passing from side to side of the strip. The warp filaments 2 are straight and in each group lie next to each other in the general plane of the strip. The warp filaments 2 are steel wires having a diameter of less than 0.5 mm. The weft filament 3 is preferably made of a synthetic material such as nylon, rayon, etc.

At least in its preferred embodiments the present invention provides a number of advantages over previous proposals, which are as follows.

One advantage is that the function performed by weft of the fabric is twofold, vix. the weft keeps the warp filaments together in their groups and keeps the groups in their correct positions in the formed fabric. It is evident that in this manner it is possible to eliminate the stranding and cabling processes, thus having a favorable effect on the cost of the fabric.

Another advantage is that rubber or synthetic materials reinforced by means of such fabric can possess improved properties. This particularly holds for rubber strips or plies reinforced with such a fabric and used for the manufacture of automotive tires, conveyor belts, etc. Since the warp filaments have not been subjected to a stranding or cabling process, almost no torsions are produced in the formed groups, so that the fabric can more easily be processed into the strips of rubber or synthetic material to be formed. Furthermore, no so-called cabling loss is produced, so that the strength of the fabric is favorably influenced.

Another advantage is that strips of rubber or synthetic material reinforced with such fabric possess a high degree of uniformity, which in normal manufacturing processes can only be achieved by means of very expensive equipment, such as special calenders and pay-off reels. When using known fabrics in which the warp is formed by cords or stranded wires, it is very difficult to obtain good uniformity during the formation of the strips. A particular advantage of this invention, at least in its preferred forms, is that the fabric is easily processed into very uniform finished products, with a quality at least equal to that of best existing products using non-woven or other known reinforcement fabrics.

Another advantage is that reinforcing material is more evenly distributed in the formed strip so that it is possible to use a smaller percentage of reinforcing material.

Furthermore, when these strips are used for example, superimposed in the manufacture of automotive tires, which are subjected to dynamic loads when used, then the possibility of vibrations being caused by non-uniformity, and of sharp objects, such as nails, glass, etc., penetrating into the strips is considerably reduced, due to a much more uniform distribution of the reinforcement fabric in the superimposed strips.

What we claimed is:

1. In a plain woven fabric for reinforcing a resilient material, the improvement in accordance with which the warp of the fabric consists of unstranded steel wires held together side by side in groups of individually straight wires by the weft of the fabric, said weft maintaining said groups in the general planes of the fabric and in spaced relationship to each other to thereby form an open weave.

2. A woven fabric as claimed in claim 1 wherein the fabric is in the form of a strip and the weft is constituted by a single filament passing from side to side of the strip.

3. A woven fabric as claimed in claim 1 wherein the weft is made from a synthetic material.

4. An article made from a resilient material and reinforced by a woven fabric as defined by claim 1.

* * * * *